US012775397B2

(12) United States Patent
Wei et al.

(10) Patent No.: US 12,775,397 B2
(45) Date of Patent: Oct. 27, 2026

(54) SHORT STRIPE REPAIR IN MEMORY SYSTEMS

(71) Applicant: Micron Technology, Inc., Boise, ID (US)

(72) Inventors: Meng Wei, Shanghai (CN); Paul Stonelake, Kihei, HI (US); Shane Nowell, Loveland, CO (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 18/998,981

(22) PCT Filed: Jul. 28, 2022

(86) PCT No.: PCT/CN2022/108565

§ 371 (c)(1),
(2) Date: Jan. 27, 2025

(87) PCT Pub. No.: WO2024/020929

PCT Pub. Date: Feb. 1, 2024

(65) Prior Publication Data

US 2026/0244347 A1 Aug. 20, 2026

(51) Int. Cl.
*G06F 12/00* (2006.01)
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
CPC ...... G06F 3/0619; G06F 3/064; G06F 3/0679; G06F 12/0246; G06F 2212/72
See application file for complete search history.

(56) References Cited

U.S. PATENT DOCUMENTS 10,984,883 B1 * 4/2021 Tungala ................ G11C 29/44
2019/0179741 A1 6/2019 Liu
(Continued)

FOREIGN PATENT DOCUMENTS

CN 102508733 A 6/2012
CN 112527201 3/2021
(Continued)

OTHER PUBLICATIONS

"European Application Serial No. 22952389.9, Response to Communication pursuant to Rules 1612 and 162 EPC filed Sep. 11, 2025", with English claims, 15 pages.
(Continued)

*Primary Examiner* — Shawn X Gu
(74) *Attorney, Agent, or Firm* — Schwegman Lundberg & Woessner, P.A.

(57) ABSTRACT

Aspects of the present disclosure configure a memory subsystem controller to provide adaptive repair on short stripes. The memory controller groups a plurality of sets of blocks of a set of memory components into respective block stripes. The memory controller computes an average width across the block stripes, the average width representing an average quantity of blocks within each of the block stripes that is associated with a reliability grade that transgresses a threshold and determines that a first block stripe of the block stripes includes a lesser quantity of blocks, associated with reliability grades that transgress the threshold, than the average quantity of blocks. The memory controller, in response to determining that the first block stripe includes the fewer quantity of blocks than the average quantity of blocks, associates one or more blocks of a second block stripe of the block stripes with the first block stripe.

20 Claims, 7 Drawing Sheets

(56) References Cited

U.S. PATENT DOCUMENTS

| | | | | |
|---|---|---|---|---|
| 2020/0286842 | A1* | 9/2020 | Sanuki .................. | G11C 5/063 |
| 2022/0188009 | A1 | 6/2022 | Wesenberg et al. | |

FOREIGN PATENT DOCUMENTS

| | | | |
|---|---|---|---|
| CN | 113220508 | A | 8/2021 |
| WO | WO-2024020929 | A1 | 2/2024 |

OTHER PUBLICATIONS

"International Application Serial No. PCT/CN2022/108565, International Search Report mailed Apr. 10, 2023", 3 pgs.

"International Application Serial No. PCT/CN2022/108565, Written Opinion mailed Apr. 10, 2023", 4 pgs.

Tao, Xu, et al., "RAID Principles", Cloud Computing Security Technology, (Jun. 30, 2019).

"European Application Serial No. 22952389.9, Extended European Search Report mailed Apr. 2, 2026", 11 pages.

"Japanese Application Serial No. 2025-504450, Notification of Reasons for Refusal mailed May 1, 2026", with English translation, 5 pages.

* cited by examiner

SHORT STRIPE REPAIR IN MEMORY SYSTEMS

PRIORITY APPLICATION

This application is a U.S. National Stage Application under 35 U.S.C. 371 from International Application No. PCT/CN2022/108565, filed 28 Jun. 2022, published as WO 2024/020929, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
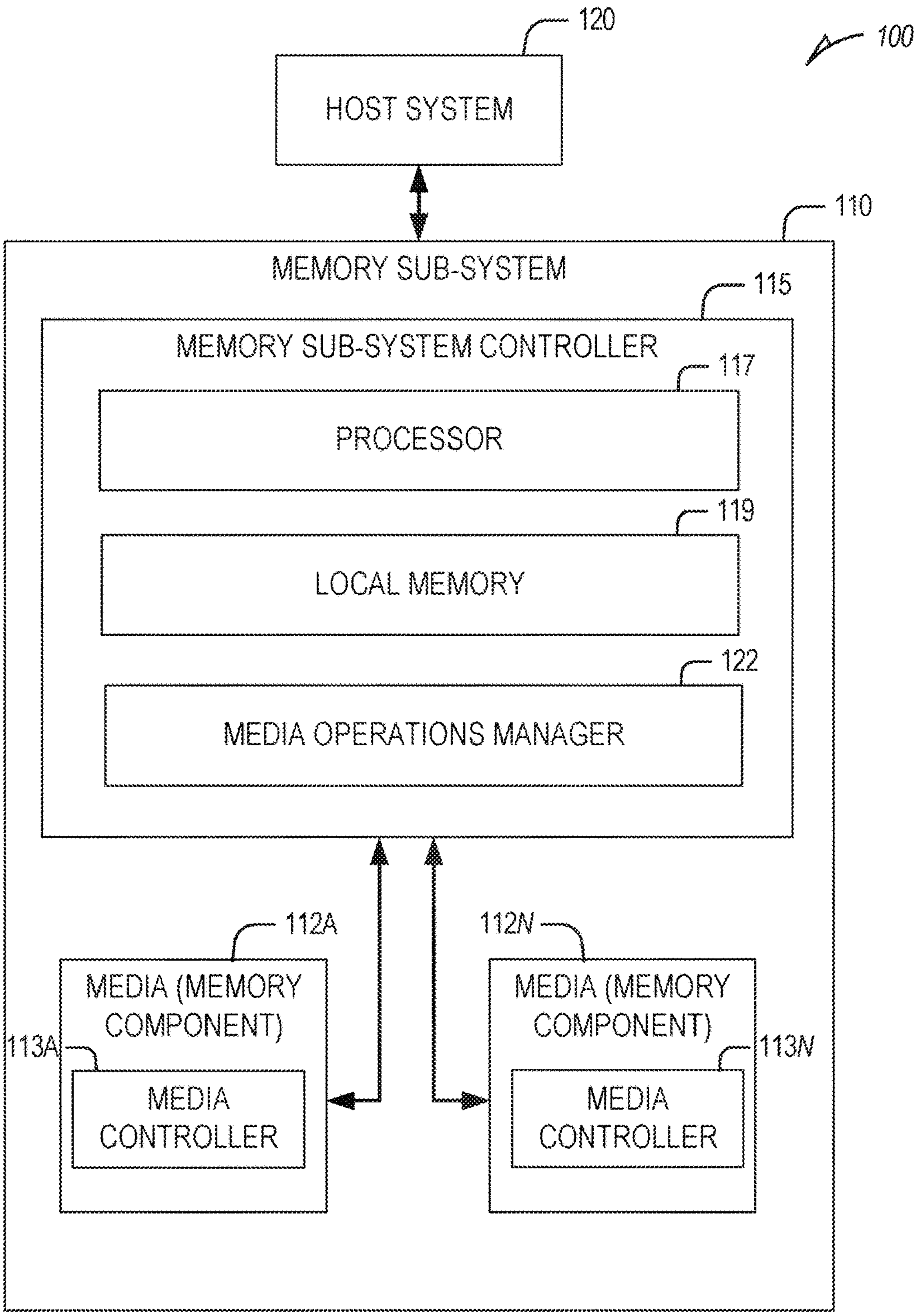
FIG. 1 is a block diagram illustrating an example computing environment including a memory sub-system, in accordance with some embodiments of the present disclosure.

Aspects of the present disclosure configure a system component, such as a memory sub-system controller, to perform block slice repair operations. The memory sub-system controller can compute an average width across a plurality of block stripes representing the average quantity of good blocks across the plurality of block stripes. Each block stripe can include a set of blocks. In some cases, each block stripe is referred to as a superblock. The average width is compared with a width of a first block stripe to determine if the first block stripe includes a lesser quantity or number of good blocks than the average number of good blocks across all of the block stripes. If so, the controller associates one or more blocks from a second block stripe with the first block stripe to replace one of the bad blocks of the first block stripe which repairs the first block stripe. This ensures that performance of the memory system remains optimal by allowing memory operations to be performed on block stripes that are at least of an average width (e.g., the block stripes on which memory operations are performed include at least an average quantity or number of good blocks). This improves the overall efficiency of operating the memory sub-system. As referred to in this disclosure, a good block is a block that is associated with a reliability grade that transgresses a reliability threshold and a bad block is a block that is associated with a reliability grade that falls below or fails to transgress the reliability threshold.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, include large die-by-die reliability (RWB) variation. As the technology for such memory devices continues to be scaled down, this die-by-die reliability variation becomes more pronounced and problematic in performing memory management. Current memory systems (e.g., SSD drive or die package systems) associate all of the memory devices in the memory system with a certain reliability specification. In some cases, each block of each memory device is associated with a reliability grade or specification which is used to determine whether the block is a good block or a bad block. Good blocks are those that have reliability grades above a reliability threshold and bad blocks are blocks that have reliability grades below a reliability threshold. The reliability grades can be set at manufacture or during operation of the memory devices, such as by measuring the data retention and/or error rate associated with particular blocks.

Typical memory systems leverage superblocks or block stripes (BS) which are a collection of blocks across memory planes and/or dies. Namely, each superblock can be of equal size and can include a respective collection of blocks across multiple planes and/or dies. The superblocks, when allocated, allow a controller to simultaneously write data to a large portion of memory spanning multiple blocks (across multiple planes and/or dies) with a single address. Sometimes, superblocks include bad blocks or blocks that have reliability grades that are below a threshold. These can be referred to as incomplete superblocks, short stripes, or short block stripes. Typical systems allocate these incomplete superblocks in the same manner as complete superblocks (e.g., superblocks that include only good blocks that have reliability grades above the threshold). This usually results in poor memory performance as performing memory operations on incomplete superblocks can result in a greater quantity of errors or unreliable memory behavior. Also, some of the bad blocks in the incomplete superblocks cannot be used to perform memory operations. This further reduces the efficiency of allocating such incomplete superblocks because less memory space is available for performing memory operations (e.g., the memory operations can only be performed on the good blocks of the incomplete superblocks). As such, applying a one-size-fits-all approach to memory systems that have a mix of complete and incomplete superblocks is inefficient and results in poor or unreliable memory performance.

Aspects of the present disclosure address the above and other deficiencies by providing a memory controller that can repair short stripes by substituting bad blocks of the short block stripes with good blocks of other block stripes. In some cases, this substitution is performed in response to detecting that the quantity of good blocks in an individual block stripe is less than an average quantity of good blocks across a plurality of block stripes, such as by more than a threshold amount. In such cases, the memory controller can select a target block stripe from which one or more blocks are selected based on determining that the target block stripe includes more than a threshold number of good blocks than the average quantity of good blocks. In this case, the memory controller can associate the one or more good blocks of the target block stripe with the individual block stripe to repair and extend the width of the individual block stripe.

For example, the memory controller can group a plurality of sets of blocks of the set of memory components into respective block stripes and compute an average width across the block stripes, the average width representing an average quantity of blocks within each of the block stripes that is associated with a reliability grade that transgresses a threshold. The memory controller can determine that a first block stripe of the block stripes includes fewer blocks, associated with reliability grades that transgress the threshold, than the average quantity of blocks. In response, the memory controller can associate one or more blocks of a second block stripe of the block stripes with the first block stripe. As a result, the memory controller can tailor the memory management operations to their particular reliability grades of the memory components without having to sacrifice performance by allocating memory operations to short block stripes. This increases the efficiency of operating memory systems.

In some examples, the memory controller obtains a plurality of widths of the block stripes, each of the plurality of widths representing a quantity of blocks within the respective block stripe that is associated with the reliability grade that transgresses the threshold. The memory controller determines that an individual width of the second block stripe is greater than the average width by at least one block and selects the second block stripe in response to determining that the individual width of the second block stripe is greater than the average width.

In some examples, the memory controller computes the average width based on an average of the plurality of widths of the block stripes. The memory controller associates one or more blocks of a third block stripe of the block stripes with the first block stripe.

In some examples, the memory controller generates a replacement table that includes a first block identifier of a first block of the first block stripe that is associated with the reliability grade that falls below the threshold. The memory controller can associate, with the first block identifier, a second block identifier of the one or more blocks of the second block stripe that has been associated with the first block stripe. The replacement table can be stored in DRAM.

In some examples, the memory controller generates a bad block table that includes a first block identifier of a first block of the first block stripe that is associated with the reliability grade that falls below the threshold. The memory controller associates, with the first block identifier, an indication of whether the first block of the first block stripe has been repaired.

In some examples, the memory controller receives a write operation associated with the first block stripe. The memory controller accesses the set of blocks of the first block stripe and determines that a first block of the set of blocks of the first block stripe is associated with a bad block indication, the bad block indication representing a block that is associated with a reliability grade below the threshold. The memory controller determines whether the first block is associated with a repaired indication. In response to determining that the first block of the set of blocks of the first block stripe is not associated with the repaired indication, the memory controller skips writing to the first block and obtains a second block of the set of blocks that is adjacent to the first block. In response to determining that the first block of the set of blocks of the first block stripe is associated with the repaired indication, the memory controller accesses a second block of the one or more blocks of the second stripe that is identified in a replacement table and performs the write operation on the second block.

In some examples, the memory controller accesses configuration data. The configuration data includes a table that associates individual blocks of the set of memory components with respective reliability grades, wherein the reliability grade describes at least one of a data retention parameter, a read disturb parameter, an error rate, a leakage current, a cross temperature parameter, or an endurance parameter. The set of blocks of the first block stripe can be distributed across multiple memory dies or across multiple memory planes. Each of the block stripes can be of equal size and includes a respective collection of blocks across multiple planes or dies.

In some examples, the memory controller performs the determining that the first block stripe includes fewer blocks than the average quantity of blocks by determining that the first block stripe includes a threshold quantity of fewer blocks than the average quantity of blocks.

In some examples, the second block stripe includes an individual block associated with a virtual defect. In such cases, the memory controller removes the virtual defect from being associated with the individual block in response to associating the one or more blocks of the second block stripe with the first block stripe.

In some examples, the determination by the memory controller that the first block stripe of the block stripes includes fewer of blocks is performed when the first block stripe is in a garbage state or erased state. The second block stripe can be selected from a garbage pool of block stripes or free pool of block stripes. The memory controller can associate the one or more blocks of the second block stripe with a third block stripe instead of the first block stripe after a period of time. The one or more blocks of the second block stripe can be selected in response to determining that a program-erase count (PEC) of the one or more blocks is lower than a PEC count of set of blocks of the first block stripe.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A, block, or page of the first memory component 112A, or group of memory components including the first memory component 112A, can be associated with a first reliability (capability) grade, value or measure. The terms "reliability grade," "value" and "measure" are used interchangeably throughout and can have the same meaning. The second memory component 112N or group of memory components including the second memory component 112N can be associated with a second reliability (capability) grade, value or measure. In some examples, each memory component 112A to 112N can store respective configuration data that specifies the respective reliability grade. In some examples, a memory or register can be associated with all of the memory components 112A to 112N which can store a table that maps different groups, bins or sets of the memory components 112A to 112N to respective reliability grades. In some examples, a memory or register can be associated with all of the memory components 112A to 112N which can store a table that indicates which blocks of each block stripe are good and which blocks are bad. In some cases, the table can indicate the quantity of good blocks in each block stripe.

In some embodiments, a block within the first memory component 112A can be grouped with a block within the second memory component 112N to form a superblock or block stripe. Superblocks (or block stripes) can be addressed collectively using a single address. In such cases, an LTP table can store the association between the single address and each of the blocks of the first memory component 112A and second memory component 112N associated with that single address. In some embodiments, some of the blocks of the superblock (or block stripe) can have reliability grades that are below a reliability threshold. These can be referred to as bad blocks. In some embodiments, some of the blocks of the superblock (or block stripe) can have reliability grades that are above a reliability threshold. These can be referred to as good blocks. A superblock (or block stripe) that includes one or more bad blocks can be referred to as an incomplete superblock or short stripe. A superblock or block stripe that includes no bad blocks and only includes good blocks is referred to as a complete superblock or complete block stripe.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans memory components 112A to 112N can correspond to or be grouped as a first block stripe and a single second row that spans memory components 112A to 112N can correspond to or be grouped as a second block stripe. If the single first row includes all good blocks (e.g., each block in the single first row has a reliability grade above a threshold), the first block stripe is a first complete block stripe. If the single first row includes some bad blocks (e.g., one or more blocks in the single first row have a reliability grade below a threshold), the first block stripe is a first short block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the reliability grades associated with different groups of the memory components 112N to 112N and/or different blocks within each of the memory components 112N to 112N. In some cases, the reliability grades are dynamic and can be updated by the memory sub-system controller 115 during operation of the memory sub-system 110 in response to determining that certain error rates are reached that transgress an error rate threshold (e.g., a reliability threshold). For example, a good block can become a bad block if that good block starts having error rates that transgress the reliability threshold. In such cases, the configuration data is updated and any block stripe that includes that now bad block is designated as a short block stripe.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to group a plurality of sets of blocks of the set of memory components into respective block stripes and compute an average width across the block stripes, the average width representing an average quantity of blocks within each of the block stripes that is associated with a reliability grade that transgresses a threshold. The memory sub-system controller 115 can determine that a first block stripe of the block stripes includes a fewer quantity of blocks, associated with reliability grades that transgress the threshold, than the average quantity of blocks. In response, the memory sub-system controller 115 can associate one or more blocks of a second block stripe of the block stripes with the first block stripe. As a result, the memory sub-system controller 115 can tailor the memory management operations to their particular reliability grades of the memory components without having to sacrifice performance by allocating memory operations to short block stripes. This increases the efficiency of operating memory systems.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
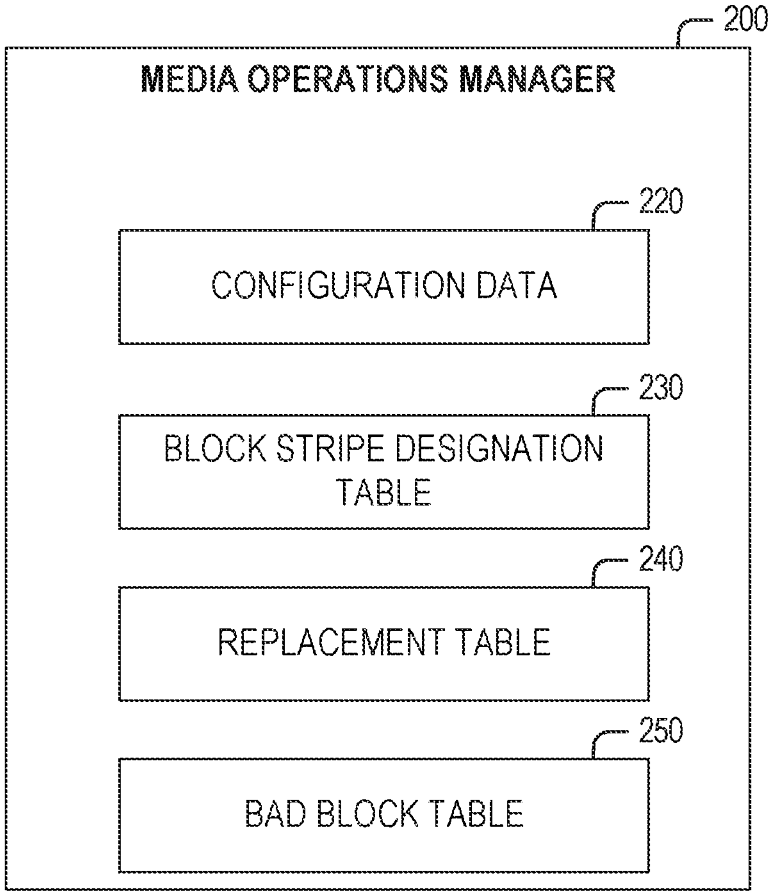
FIG. 2 is a block diagram of an example media operations manager, in accordance with some implementations of the present disclosure.

FIG. 2 is a block diagram of an example media operations manager 200 (which represents the media operations manager 122), in accordance with some implementations of the present disclosure. As illustrated, the media operations manager 122 includes configuration data 220, a block stripe designation table 230, a replacement table 240, and a bad block table 250. For some embodiments, the media operations manager 122 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including reliability grades of different bins, groups, blocks, block stripes, and/or sets of the memory components 112A to 112N. The media operations manager 122 receives configuration data from the host system 120 and stores the configuration data in the configuration data 220.

In some examples, the media operations manager 122 performs one or more test operations on different groups or blocks of the memory components 112A to 112N. The test operations are configured to determine reliability of each block of the memory components 112A to 112N. Based on a result of the test operations, the media operations manager 122 can store or update the reliability grades stored in the configuration data 220 for the different groups or blocks of memory components 112A to 112N. In some examples, the media operations manager 122 can periodically or routinely perform the test operations. The media operations manager 122 can determine that an individual memory component 112A is associated with a first reliability grade based on the configuration data 220. The media operations manager 122 can perform a set of test operations on the individual memory component 112A and can determine, based on a result of the test operations, that the reliability grade of the individual memory component 112A has increased or decreased and is now a second reliability grade. The media operations manager 122 can, in response, transition the individual memory components 112A from being associated with a first group of individual memory components 112A to 112N to a second group of individual memory components 112A to 112N that is associated with the second reliability grade.

Figure 3:
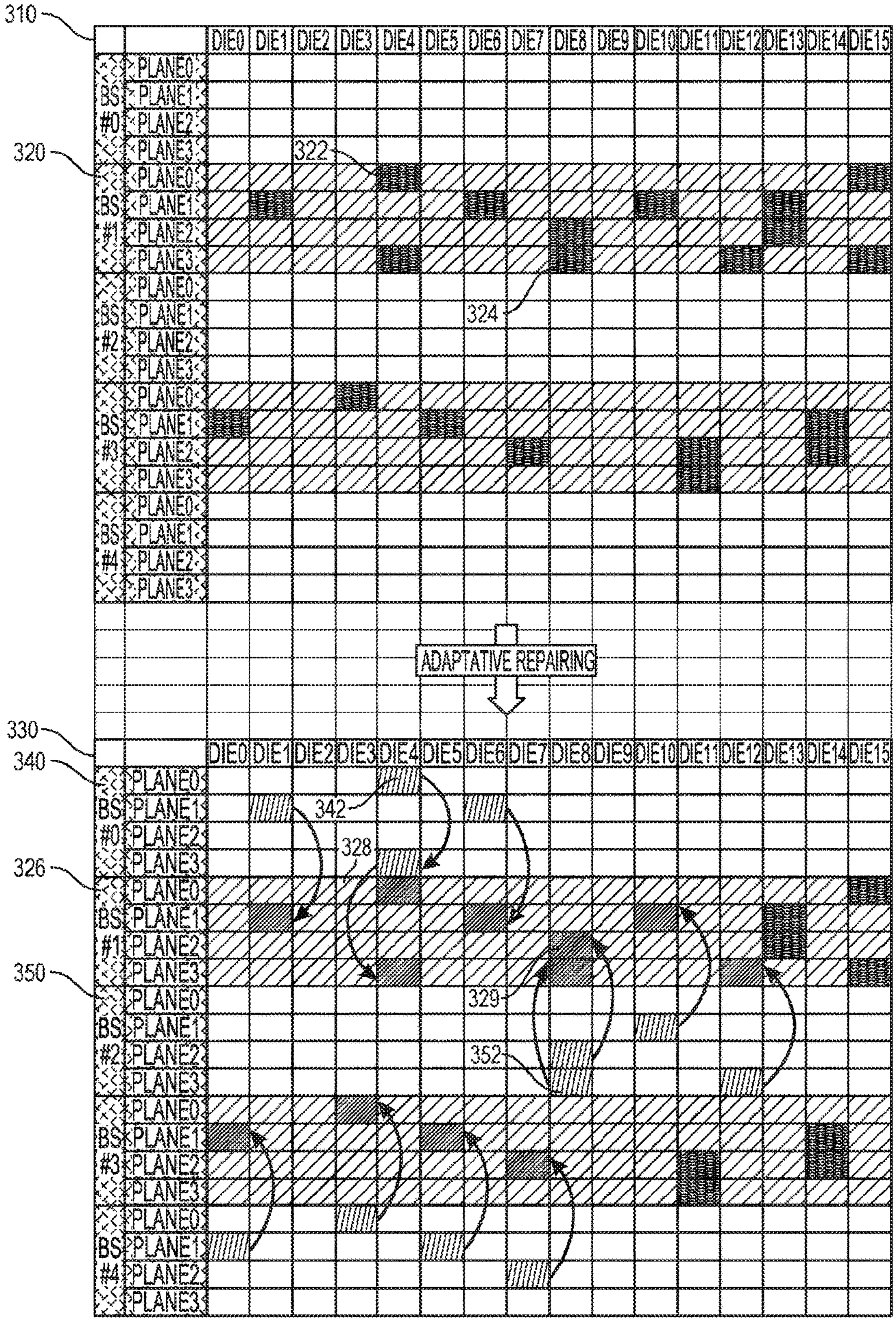
FIG. 3 is a block diagram of example block slice repair operations, in accordance with some implementations of the present disclosure.

In some examples, the media operations manager 122 processes the configuration data 220 to generate a block stripe designation table 230 that lists addresses of block stripes along with respective indications of the quantity or number of good blocks and/or bad blocks included in each block stripe. For example, a first address in the table can be associated with a first row of good and/or bad blocks across multiple dies or planes representing a first block stripe. A second address in the table can be associated with a second row of good and/or bad blocks across multiple dies or planes representing a second block stripe. Specifically, as shown in FIG. 3, a configuration of the memory components 112A to 112N is provided. The configuration includes a set of dies 0-15 (e.g., the memory components 112A to 112N).

The media operations manager 122 processes the configuration data 220 to determine that a first row of blocks across multiple planes 0-3 of the set of dies 0-15 have a reliability grade that corresponds to a reliability threshold (e.g., have error rates that are below a specified error rate threshold). In such cases, the media operations manager 122 stores an indication that the first block stripe includes all good blocks and stores the address or identifier of the first block stripe in the block stripe designation table 230. The identifier of the first block stripe can include an address that accesses all of the blocks across planes 0-3 of the set of dies 0-15. Similarly, the media operations manager 122 associates other block stripe identifiers with other rows (across multiple planes 0-3 of the set of dies 0-15) of good blocks.

In some cases, the media operations manager 122 identifies a bad block 322 in an individual row of blocks of a block stripe that also includes a set of good blocks. In response, the media operations manager 122 stores an indication in the block stripe designation table 230 of the short block stripe 320 along with the quantity of good or bad blocks included in the short block stripe 320.

In some examples, the media operations manager 122 can generate or compute an average width across the block stripes of the memory components 112A to 112N. To do so, the media operations manager 122 can access the block stripe designation table 230 to generate an indication of width of each block stripe. Specifically, the block stripe designation table 230 can store a first number or first quantity representing a first width of the total number of good blocks for a first block stripe and can store a second number or second quantity representing a second width of the total number of good blocks for a second block stripe (e.g., the short block stripe 320). The media operations manager 122 can compute an average of all of the widths or quantities of good blocks available across all of the block stripes. The media operations manager 122 stores this average width in association with the block stripe designation table 230. This results in an initial configuration 310 of block stripes in the memory components 112A to 112N.

Periodically or in response to detecting that a given block stripe includes a bad block, the media operations manager 122 can perform a set of repair operations to generate a second configuration 330 of the block stripes in the memory components 112A to 112N. For example, the media operations manager 122 can obtain the width of the given block stripe representing the total quantity of good blocks available in the given block stripe. The media operations manager 122 compares the width of the given block stripe to the average width stored in the block stripe designation table 230. In response to determining that the width of the given block stripe is less than the average width, the media operations manager 122 can perform a repair operation to associate a good block from another block stripe with the given block stripe. In some cases, the media operations manager 122 performs the repair operation in response to determining that the width of the given block stripe is smaller than the average width by more than a threshold. Namely, the media operations manager 122 can determine that the given block stripe includes fewer good blocks than the average width by more than the threshold.

In some examples, the media operations manager 122 generates a bad block table 250 that includes a block identifier of a block of the block stripe that is associated with the reliability grade that falls below the threshold. Specifically, the media operations manager 122 can add to the bad block table 250 an identifier of the bad block 322 of the short block stripe 320 in the bad block table 250. The media operations manager 122 can also store in association with the bad block 322 an indication of whether the bad block 322 has been repaired.

To repair the given block stripe, the media operations manager 122 searches the widths of other block stripes in the block stripe designation table 230. The media operations manager 122 can set a threshold amount (e.g., 2 or more) by which to control which block stripe is selected to be used to repair the given block stripe. Namely, the media operations manager 122 can compare the width (representing quantity of good blocks) of a second block stripe with the average width. In response to determining that the width of the second block stripe is less than or equal to the average width, the media operations manager 122 discards the second block stripe from being selected and accesses the width of a third block stripe. The media operations manager 122 can compare the width (representing quantity of good blocks) of the third block stripe with the average width. In response to determining that the width of the second block stripe is greater than the average width by less than the threshold (e.g., is only greater by 1 not 2 good blocks), the media operations manager 122 discards the third block stripe from being selected and accesses the width of a fourth block stripe. The media operations manager 122 can compare the width (representing quantity of good blocks) of the fourth block stripe with the average width. In response to determining that the width of the fourth block stripe is greater than the average width by at least the threshold, the media operations manager 122 selects the fourth block stripe to repair the given block stripe.

In some examples, the media operations manager 122 identifies a good block in the selected fourth block stripe. For example, the media operations manager 122 can identify that the block stripe 350 includes a width that is greater than the average width by at least the threshold and can identify a good block 352 included in the block stripe 350. The media operations manager 122 can replace the bad block 324 of the block stripe 320 (e.g., the given block stripe) with the good block 352 of the block stripe 350. In some cases, the media operations manager 122 updates indication associated with the bad block 324 in the bad block table 250 to specify that the bad block 324 has been repaired. The media operations manager 122 also generates a replacement table 240 to identify the good block 352 that has been used to replace the bad block 324. The replacement table 240 can be stored off-chip, such as in DRAM.

In some examples, the media operations manager 122 can select the good block from the fourth block stripe based on a PEC count of each of the good blocks of the fourth block stripe. Namely, the media operations manager 122 can access a PEC count of the good blocks of the fourth block stripe. The media operations manager 122 can select a good block from the fourth block stripe to be used to replace the bad block of the given block stripe based on the PEC count being the minimum or the maximum among the PEC counts of the good blocks of the fourth block stripe. In some cases, the media operations manager 122 can obtain an average PEC count of the good blocks from the given block stripe (that includes the bad block to be repaired). The media operations manager 122 selects the good block from the fourth block stripe that is associated with a PEC count that corresponds to or is within a threshold difference of the average PEC count of the good blocks of the given block stripe. In some examples, the good block is selected in response to determining that the PEC count of the good block is lower than the PEC of the given block stripe. In some examples, the media operations manager 122 determines that the fourth block stripe is currently in a garbage pool of to-be-erased block stripes rather than a free pool of block stripes that have already been erased and are ready to be written to. In such cases, the media operations manager 122 can erase the fourth block stripe or the selected good block prior to or after associating the selected good block with the bad block of the given block stripe. Good blocks of block stripes that are used to replace bad blocks of other block stripes can also be referred to as "victim blocks" or "victim physical blocks."

In some examples, the media operations manager 122 can store an indication in the replacement table 240 of the bad block 324 and the reference to the good block 352. This way, when a subsequent memory operation (e.g., read/write/garbage collection) is performed with respect to the given block stripe (e.g., block stripe 320), the media operations manager 122 can perform the memory operation on all of the good blocks of the given block stripe and on any blocks of a different block stripe that are associated with the bad blocks of the given block stripe, such as the good block 352. In some examples, to reduce the size of the replacement table 240, a hash table can be used. The key-value in the hash table can be the block stripe index. Each entry of the hash table can include the replaced block number and next entry pointer. The next point can be up to 34 bits to represent bigger than 4 GB DRAM. 6 bytes can be used to represent the next pointer. With the 2 bytes of replaced block index, there can be a total of 8 bytes to store in each hash table entry. Below is an example of the hash table:

| Key | Entry | Entry | . . . | Entry | Entry | Entry |
|---|---|---|---|---|---|---|
| 0 | Block + Next | Block + Null | | | | |
| 1 | Block + Next | Block + Next | . . . | Block + Null | | |
| 2 | Block + Null | | | | | |
| . . . | . . . | | | | | |
| 555 | Block + Null | | | | | |

In some examples, the media operations manager 122 determines that the fourth block stripe 350 from which the good block was selected to repair the bad block of the given block stripe includes one or more virtual defects. Virtual defects can be introduced by the media operations manager 122 into one or more block stripes to prevent access to such blocks when a memory operation is performed with respect to the block stripes with the virtual defects. These virtual defects can be treated as bad blocks for a temporary period of time. The virtual defects can be introduced to preserve a certain geometry that is provided to a host in which all of the block stripes have a similar quantity of blocks despite some block stripes having real bad blocks and some block stripes having virtual defects or virtual bad blocks. In response to determining that the fourth block stripe 350 includes a virtual defect, the media operations manager 122 can remove the virtual defect after associating the good block with the given block stripe. This continues to preserve the geometry that is provided to the host. Namely, because a good block has been removed from the fourth block stripe 350 to repair a different block stripe, the media operations manager 122 can now make the virtually defected block available for use as a good block to keep the same quantity of good blocks available in the fourth block stripe 350.

Specifically, if the block stripe width varies due to real defects, the host and SSD can quickly get out of sync which can result in unwanted garbage collection and significant increase in write amplification. By including a variable number of virtual defects in all block stripes that are decreased every time a grown bad block is added, the logical block stripe size can be held constant throughout the life of the SSD, and across all drives.

In some cases, with virtual defects, if the location of the virtual defect is fixed, then those physical blocks are not used until a real defect is detected or until a good block of the block stripe with the virtual defect is used to repair another bad block. In order to wear evenly across the block stripe with the virtual defect, the starting offset of virtual defects within the block stripe can be incremented based on physical PEC. In an example, the offset can be computed according to the following equation:

$$\text{Offset}=\text{Physical PEC} \% (\text{Physical BS Width}-\text{Grown Bad Blocks})$$

Virtual defects may skip real defect locations within the block stripe and can be spread out in a fixed cadence to ensure they are not clustered, for example on same NAND channel. In some cases, the physical PEC for the block stripe is higher than actual PEC for each block. As such, an adjusted PEC for the block stripe can be maintained separately to account for dilution of virtual defects. The adjusted PEC that supports block stripes with 256 die can be split into two components (an adjusted PEC upper component which can include 8 bits and an adjusted PEC lower component which can include 8 bits). Every erase of the block stripe can cause the adjusted PEC lower component to be incremented by 1 and compared to (Physical BS Width–Grown Bad Blocks). If the adjusted PEC lower component equals the difference between the physical block stripe width and the grown bad blocks, the adjusted PEC upper component is incremented by 1, and adjusted PEC lower component is reset to 0. To calculate the final adjusted PEC for the block stripe, the following equation can be used:

$$\text{Adjusted PEC}=(\text{Adjusted PEC Upper}*\text{Logical BS Width})+\min(\text{Adjusted PEC Lower},\text{Logical BS Width})$$

In such cases, as long as the logical block stripe width is constant through the life of the SSD, the adjusted PEC represents the actual PEC of each individual block in the block stripe.

The media operations manager 122 can also update the width stored in the block stripe designation table 230 for the given block stripe to increment the quantity of good blocks resulting from the replacement of the bad block with a good block from another block stripe. Similarly, the media operations manager 122 can also update the width stored in the block stripe designation table 230 for the block stripe 350 to decrement the quantity of good blocks resulting from the replacement of the bad block with a good block from the fourth block stripe 350. Namely, because one or more good blocks of the fourth block stripe 350 have been allocated or used to repair bad blocks of the given block stripe, the width of the fourth block stripe 350 is reduced by the quantity of good blocks that have been allocated to other block stripes.

In some examples, the media operations manager 122 can recompute the average width based on the widths stored in the block stripe designation table 230. The media operations manager 122 can determine that the given block stripe still includes fewer good blocks than the average width even after being repaired. In such cases, the media operations manager 122 can identify another block stripe from which to obtain good blocks to repair other bad blocks in the given block stripe. For example, the media operations manager 122 can determine that a fifth block stripe 340 includes a good block 342 that can be used to repair a bad block 322. In such cases, after being repaired, the bad block 322 now is associated in the replacement table 240 with the good block 342 and becomes known as a first repaired block 328 in the repaired block stripe 326. Namely, the repaired block stripe 326 includes a first repaired block 328 based on the association of the bad block 322 of the block stripe 320 with the good block 342 of the fifth block stripe 340 and includes a second repaired block 329 based on the association of the bad block 324 of the block stripe 320 with the good block 352 of the fourth block stripe 350.

In some examples, the media operations manager 122 can associate the good block 352 with a different bad block of a different block stripe instead of the block stripe 326. This results in the block stripe 326 which was previously repaired with the good block 352 returning to having a bad block 324 and the different block stripe having a repaired block. The media operations manager 122 can update the bad block table 250 to indicate that the bad block 324 is not repaired and can update the replacement table 240 to remove the association between the bad block 324 and the good block 352.

In some examples, the media operations manager 122 can initiate the search for target block stripes to repair and victim blocks to use to replace bad blocks during device manufacture. Namely, the media operations manager 122 can receive a command from a host that includes a low-level format process or other vendor-specific command. In response, the media operations manager 122 performs the operations to compute the average width and search for block stripes that includes widths smaller than the average width to repair their bad blocks with good blocks of other block stripes.

In some examples, the given block stripe can be repaired while in any one of several states. For example, the given block stripe can be repaired while the given block stripe is in a garbage pool and waiting to be erased. The given block stripe can be repaired while in the open state after being erased and is ready to be written to. The given block stripe can be repaired after being written to and is in the closed state.

In some examples, once a proper victim candidate block stripe is found, the media operations manager 122 can trigger the folding to move the candidate block stripe from a closed state to a garbage state and then apply the repair process. Before the candidate BS can be freed up as garbage pool, the media operations manager 122 can keep the shorter stripe in the free pool.

In some examples, the media operations manager 122 can determine that a read/write operation is a random memory operation rather than a sequential memory operation. Namely, if the memory operation does not utilize a substantial or more than a threshold quantity of good blocks of a block stripe, the media operations manager 122 can allocate such memory operations to block stripes that have widths smaller than the average width (e.g., the memory operations are allocated to short block stripes). This preserves complete block stripes for memory operations that are sequential and utilize all or substantially all or more than the threshold quantity of blocks of the block stripe. In some cases, data that is read more often or with a certain read frequency can be moved or maintained in block stripes that have widths greater than a certain threshold or widths greater than most or all of the other block stripes to improve quality of service (QoS) due to fewer die collisions.

Figure 4:
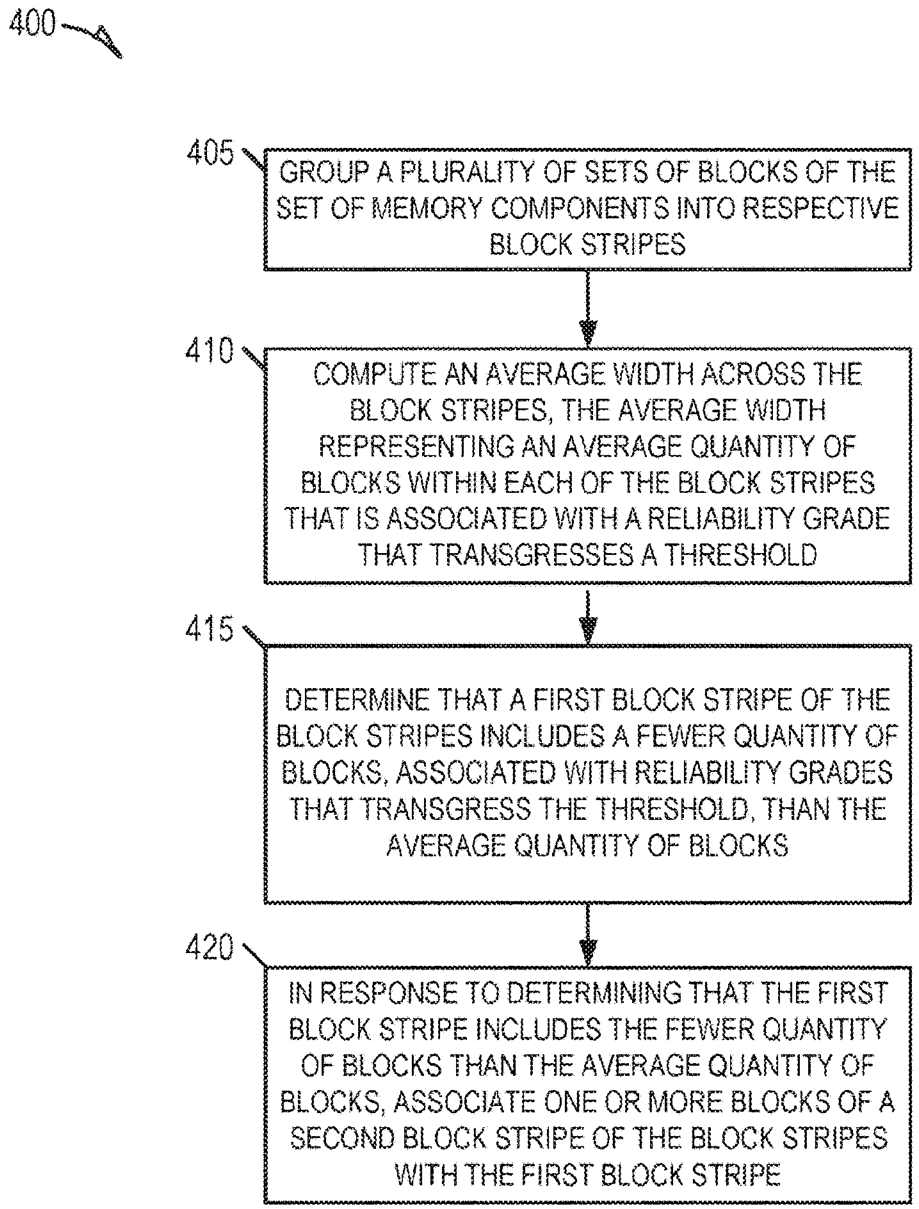
FIGS. 4, 5A, and 5B are flow diagrams of example methods to perform block slice repair operations, in accordance with some implementations of the present disclosure.

FIG. 4 is a flow diagram of an example method 400 to repair block stripes, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a media operations manager 122 of a memory sub-system (e.g., memory sub-system 110) grouping a plurality of sets of blocks of the set of memory components into respective block stripes. Then, at operation 410, the media operations manager 122 of the memory sub-system computes an average width across the block stripes, the average width representing an average quantity of blocks within each of the block stripes that is associated with a reliability grade that transgresses a threshold. Thereafter, at operation 415, the media operations manager 122 determines that a first block stripe of the block stripes includes a lesser quantity of blocks, associated with reliability grades that transgress the threshold, than the average quantity of blocks. The media operations manager 122, at operation 420, in response to determining that the first block stripe includes fewer blocks than the average quantity of blocks, associates one or more blocks of a second block stripe of the block stripes with the first block stripe.

Figure 5A:
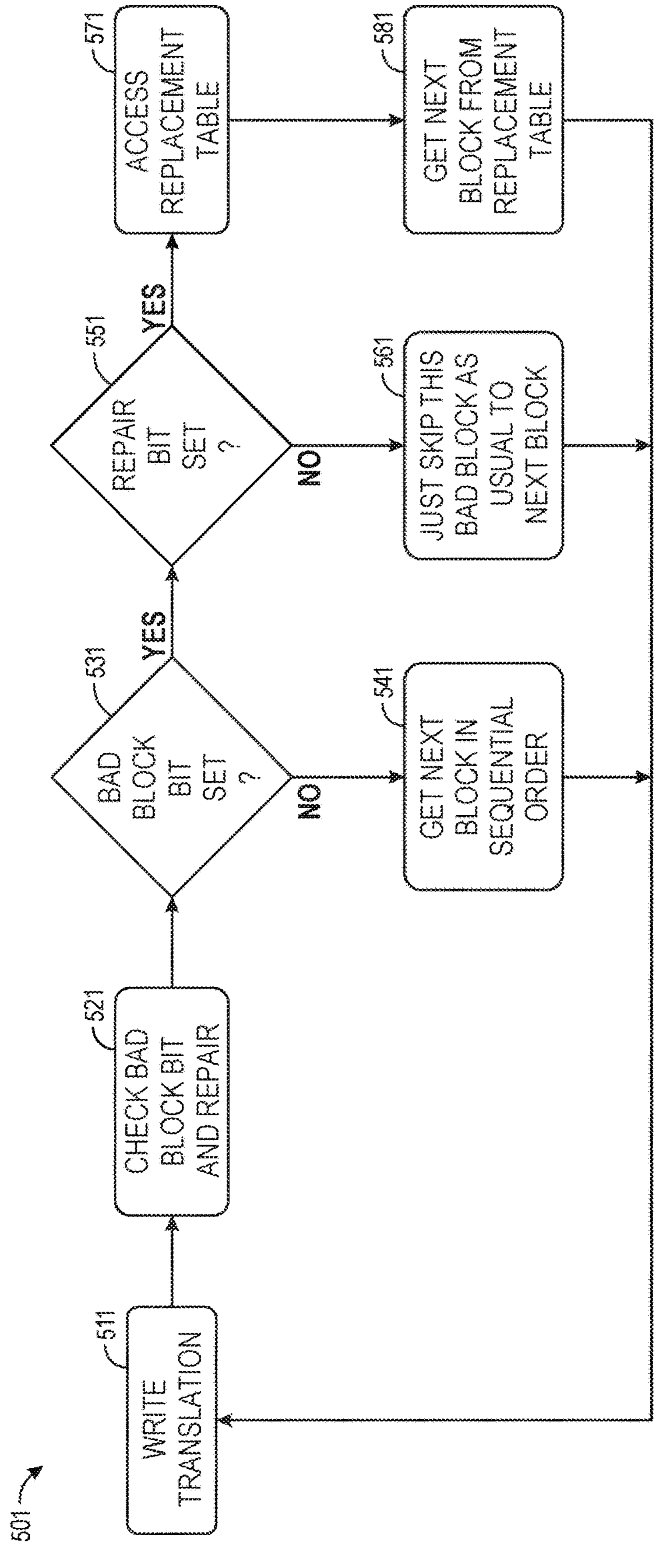

FIG. 5A is a flow diagram of an example method 501 to write to repaired block stripes, in accordance with some implementations of the present disclosure. The method 501 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 501 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 5A, the method (or process) 501 begins at operation 511, with a media operations manager 122 of a memory sub-system (e.g., memory sub-system 110) receiving a command from a host to write to a designated block stripe. In response, at operation 521, the media operations manager 122 checks if a block within the designated block stripe is associated with a bad block and/or has been repaired, such as by accessing the information from the bad block table 250. The media operations manager 122 determines, at operation 531, if the bad block bit is set in the bad block table 250. In response to determining that the bad block table 250 indicates that the block within the designated block stripe is bad, at operation 551, the media operations manager 122 determines whether the bad block table 250 includes an indication that the block has been repaired. In response to determining that the bad block table 250 indicates that the block within the designated block stripe is not bad or is good, at operation 541, the media operations manager 122 performs a memory operation with respect to the block and selects the next block in the sequential ordering of blocks of the designated block stripe.

If, at operation 551, the media operations manager 122 determines that the repair bit is set for the block, the media operations manager 122 accesses the replacement table 240 at operation 571. The media operations manager 122 obtains from the replacement table 240 the reference or identifier of the good block that is associated with the bad block at operation 581. The media operations manager 122 performs the memory operations on the identified good block associated with the bad block and then selects the next block in the sequential order of the designated block stripe. If, at operation 551, the media operations manager 122 determines that the repair bit is not set for the block, the media operations manager 122 skips performing the memory operations on the block and accesses the next block in the sequential ordering of blocks of the designated block stripe at operation 561. In some examples, if, at operation 551, the media operations manager 122 determines that the repair bit is not set for the block, the media operations manager 122 performs the method 502 of FIG. 5B to repair the bad block.

Figure 5B:
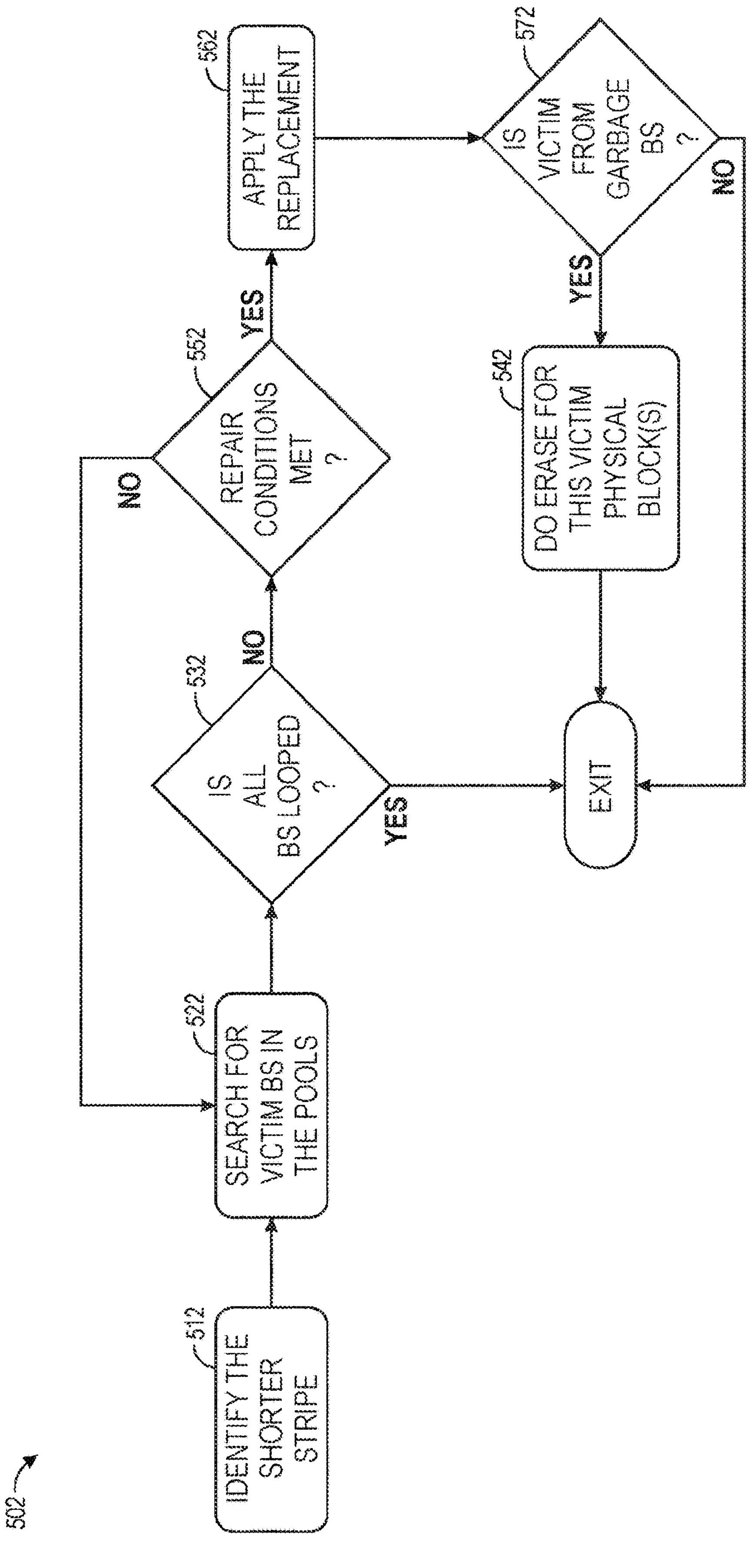

FIG. 5B is a flow diagram of an example method 502 to repair block stripes, in accordance with some implementations of the present disclosure. The method 502 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 502 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 5B, the method (or process) 502 begins at operation 512, with a media operations manager 122 of a memory sub-system (e.g., memory sub-system 110) identifying a short block stripe (e.g., block stripe with at least one bad block and which has a width that is smaller than the average width of all the block stripes). Then, at operation 522, the media operations manager 122 searches for victim block stripes in the garbage or free pools. At operation 532, the media operations manager 122 determines if all the block stripes have been processed to find the victim block stripe or victim block. If so, the media operations manager 122 terminates the repair operation.

In response to determining that there are block stripes left to process, at operation 552, the media operations manager 122 determines whether a next block stripe satisfies repair conditions. Namely, the media operations manager 122 can determine if the width (number of good blocks) of the next block stripe is greater than the average width (average number of good blocks) of all the block stripes by at least a threshold amount. In response to determining that the next block stripe fails to satisfy the repair conditions at operation 552, the media operations manager 122 returns to operation 522 to search for another block stripe. In response to determining that the next block stripe satisfies the repair conditions at operation 552, the media operations manager 122 applies the replacement at operation 562, such as by selecting a good block (e.g., victim block) from the next block stripe and associating the selected good block with the bad block of the short block stripe identified at operation 512. At operation 572, the media operations manager 122 determines if the victim block is from the garbage pool. If so, the media operations manager 122, at operation 542, erases the victim block that is associated with the bad block of the short block stripe.

In view of the disclosure above, various examples are set forth below. It should be noted that one or more features of an example, taken in isolation or combination, should be considered within the disclosure of this application.

Example 1: a system comprising: a set of memory components of a memory sub-system; and a processing device operatively coupled to the set of memory components, the processing device being configured to perform operations comprising: grouping a plurality of sets of blocks of the set of memory components into respective block stripes; computing an average width across the block stripes, the average width representing an average quantity of blocks within each of the block stripes that is associated with a reliability grade that transgresses a threshold; determining that a first block stripe of the block stripes includes a lesser quantity of blocks, associated with reliability grades that transgress the threshold, than the average quantity of blocks; and in response to determining that the first block stripe includes the lesser quantity of blocks than the average quantity of blocks, associating one or more blocks of a second block stripe of the block stripes with the first block stripe.

Example 2: the system of Example 1 wherein the operations comprise obtaining a plurality of widths of the block stripes, each of the plurality of widths representing a quantity of blocks within the respective block stripe that is associated with the reliability grade that transgresses the threshold.

Example 3: the system of Examples 1 or 2, wherein the operations comprise: determining that an individual width of the second block stripe is greater than the average width by at least one block; and selecting the second block stripe in response to determining that the individual width of the second block stripe is greater than the average width.

Example 4: the system of any one of Examples 1-3, wherein the operations comprise computing the average width based on an average of the plurality of widths of the block stripes.

Example 5: the system of any one of Examples 1-4, wherein the operations comprise associating one or more blocks of a third block stripe of the block stripes with the first block stripe.

Example 6: the system of any one of Examples 1-5, wherein the operations comprise: generating a replacement table that includes a first block identifier of a first block of the first block stripe that is associated with a reliability grade that transgresses (e.g., falls below) the threshold; and associating, with the first block identifier, a second block identifier of the one or more blocks of the second block stripe that has been associated with the first block stripe.

Example 7: the system of Example 6, wherein the replacement table is stored in a DRAM.

Example 8: the system of any one of Examples 1-7, wherein the operations comprise: generating a bad block table that includes a first block identifier of a first block of the first block stripe that is associated with the reliability grade that falls below the threshold; and associating, with the first block identifier, an indication of whether the first block of the first block stripe has been repaired.

Example 9: the system of any one of Examples 1-8, wherein the operations comprise: receiving a write operation associated with the first block stripe; accessing a set of blocks of the first block stripe; determining that a first block of the set of blocks of the first block stripe is associated with a bad block indication, the bad block indication representing a block that is associated with a reliability grade below the threshold; and determining whether the first block is associated with a repaired indication.

Example 10: the system of Example 9, wherein the operations comprise in response to determining that the first block of the set of blocks of the first block stripe is not associated with the repaired indication, skipping writing to the first block and obtaining a second block of the set of blocks that is adjacent to the first block.

Example 11: the system of any one of Examples 1-10, wherein the operations comprise: in response to determining that the first block of the set of blocks of the first block stripe is associated with the repaired indication, accessing a second block of the one or more blocks of the second stripe that is identified in a replacement table; and performing the write operation on the second block.

Example 12: the system of any one of Examples 1-11, wherein the operations comprise accessing configuration data, wherein the configuration data comprises a table that associates individual blocks of the set of memory components with respective reliability grades, wherein the reliability grade describes at least one of a data retention parameter, a read disturb parameter, an error rate, a leakage current, a cross temperature parameter, or an endurance parameter.

Example 13: the system of any one of Examples 1-12, wherein the determining that the first block stripe includes the lesser quantity of blocks than the average quantity of blocks comprises determining that the first block stripe includes a threshold quantity of fewer blocks than the average quantity of blocks.

Example 14: the system of any one of Examples 1-13, wherein the set of blocks of the first block stripe is distributed across multiple memory dies or across multiple memory planes, and wherein each of the block stripes is of equal size and includes a respective collection of blocks across multiple planes or dies.

Example 15: the system of any one of Examples 1-14, wherein the second block stripe includes an individual block associated with a virtual defect, and wherein the operations comprise: removing the virtual defect from being associated with the individual block in response to associating the one or more blocks of the second block stripe with the first block stripe.

Example 16: the system of any one of Examples 1-15, wherein the determining that the first block stripe of the block stripes includes the lesser quantity of blocks is performed when the first block stripe is in a garbage state or erased state, and wherein the second block stripe is selected from a garbage pool of block stripes or free pool of block stripes.

Example 17: the system of any one of Examples 1-16, wherein the operations comprise associating the one or more blocks of the second block stripe with a third block stripe instead of the first block stripe after a period of time.

Example 18: the system of any one of Examples 1-17, wherein the one or more blocks of the second block stripe are selected in response to determining that a program-erase count (PEC) of the one or more blocks is lower than a PEC count of the set of blocks of the first block stripe.

Methods and computer-readable storage medium with instructions for performing any one of the above Examples.

Figure 6:
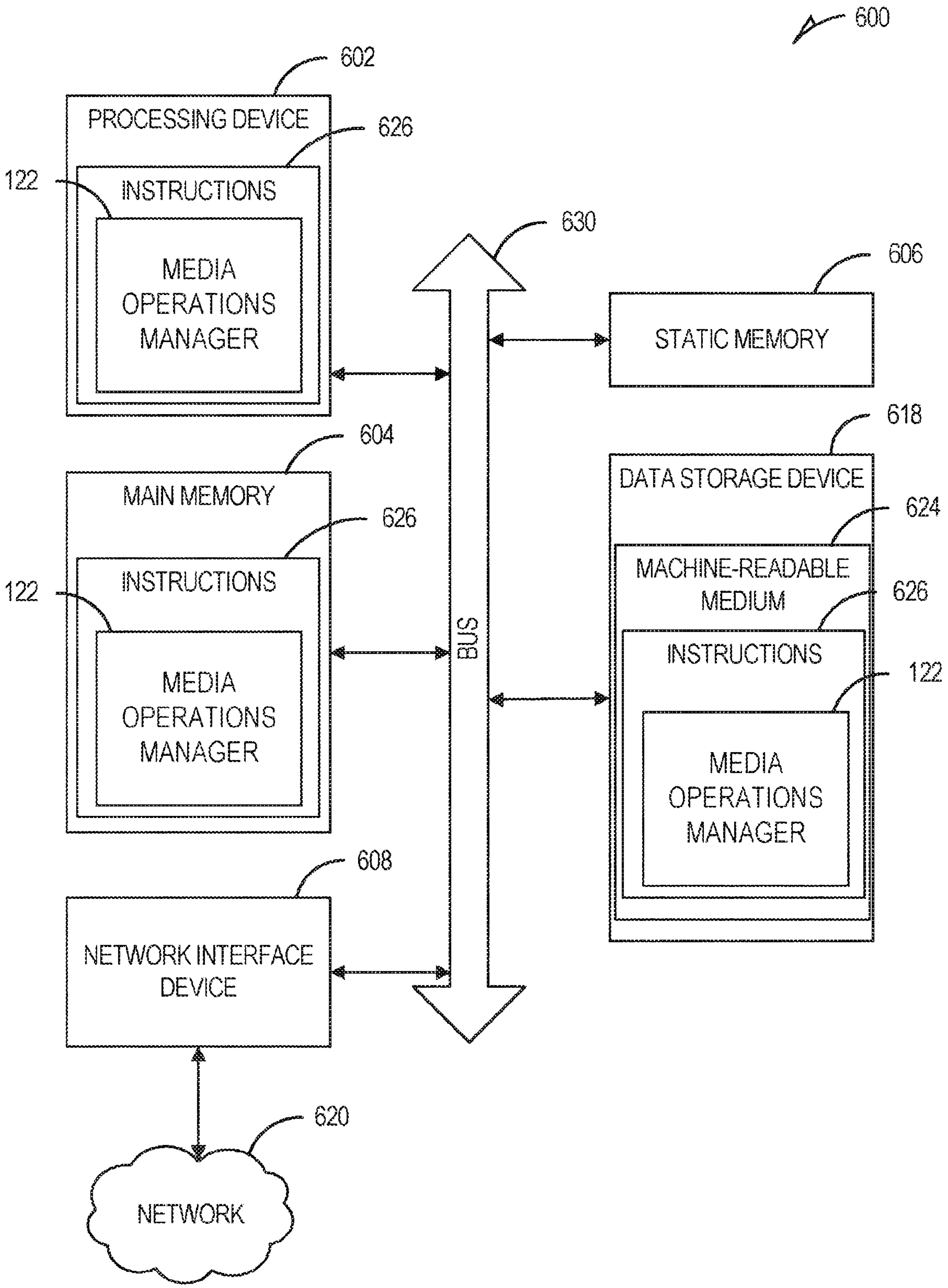
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a set of memory components of a memory sub-system; and a processing device operatively coupled to the set of memory components, the processing device being configured to perform operations comprising:

grouping a plurality of sets of blocks of the set of memory components into respective block stripes;

computing an average width across the block stripes, the average width representing an average quantity of blocks within each of the block stripes that are associated with a reliability grade that transgresses a threshold;

determining that a first block stripe of the block stripes includes a lesser quantity of blocks, associated with reliability grades that transgress the threshold, than the average quantity of blocks; and in response to determining that the first block stripe includes the lesser quantity of blocks than the average quantity of blocks, associating one or more blocks of a second block stripe of the block stripes with the first block stripe.

2. The system of claim 1, wherein the operations comprise:

obtaining a plurality of widths of the block stripes, each of the plurality of widths representing a quantity of blocks within the respective block stripe that is associated with a reliability grade that transgresses the threshold.

3. The system of claim 2, wherein the operations comprise:

determining that an individual width of the second block stripe is greater than the average width by at least one block; and selecting the second block stripe in response to determining that the individual width of the second block stripe is greater than the average width.

4. The system of claim 2, wherein the operations comprise:

computing the average width based on an average of the plurality of widths of the block stripes.

5. The system of claim 1, wherein the operations comprise:

associating one or more blocks of a third block stripe of the block stripes with the first block stripe.

6. The system of claim 1, wherein the operations comprise:

generating a replacement table that includes a first block identifier of a first block of the first block stripe that is associated with a reliability grade that falls below the threshold; and associating, with the first block identifier, a second block identifier of the one or more blocks of the second block stripe that has been associated with the first block stripe.

7. The system of claim 6, wherein the replacement table is stored in dynamic random access memory (DRAM).

8. The system of claim 6, wherein the operations comprise:

generating a bad block table that includes a first block identifier of a first block of the first block stripe that is associated with the reliability grade that falls below the threshold; and associating, with the first block identifier, an indication of whether the first block of the first block stripe has been repaired.

9. The system of claim 1, wherein the operations comprise:

receiving a write operation associated with the first block stripe;

accessing a set of blocks of the first block stripe;

determining that a first block of the set of blocks of the first block stripe is associated with a bad block indication, the bad block indication representing a block that is associated with a reliability grade below the threshold; and determining whether the first block is associated with a repaired indication.

10. The system of claim 9, wherein the operations comprise:

in response to determining that the first block of the set of blocks of the first block stripe is not associated with the repaired indication, skipping writing to the first block and obtaining a second block of the set of blocks that is adjacent to the first block.

11. The system of claim 9, wherein the operations comprise:

in response to determining that the first block of the set of blocks of the first block stripe is associated with the repaired indication, accessing a second block of the one or more blocks of the second stripe that is identified in a replacement table; and performing the write operation on the second block.

12. The system of claim 1, wherein the operations comprise:

accessing configuration data, wherein the configuration data comprises a table that associates individual blocks of the set of memory components with respective reliability grades, wherein each reliability grade describes at least one of a data retention parameter, a read disturb parameter, an error rate, a leakage current, a cross temperature parameter, or an endurance parameter.

13. The system of claim 1, wherein the determining that the first block stripe includes the lesser quantity of blocks than the average quantity of blocks comprises determining that the first block stripe includes a threshold quantity of fewer blocks than the average quantity of blocks.

14. The system of claim 1, wherein a set of blocks of the first block stripe is distributed across multiple memory dies or across multiple memory planes, and wherein each of the block stripes is of equal size and includes a respective collection of blocks across multiple planes or dies.

15. The system of claim 1, wherein the second block stripe includes an individual block associated with a virtual defect, and wherein the operations comprise:

removing the virtual defect from being associated with the individual block in response to associating the one or more blocks of the second block stripe with the first block stripe.

16. The system of claim 1, wherein the determining that the first block stripe of the block stripes includes the lesser quantity of blocks is performed when the first block stripe is in a garbage state or erased state, and wherein the second block stripe is selected from a garbage pool of block stripes or free pool of block stripes.

17. The system of claim 1, wherein the operations comprise associating the one or more blocks of the second block stripe with a third block stripe instead of the first block stripe after a period of time.

18. The system of claim 1, wherein the one or more blocks of the second block stripe are selected in response to determining that a program-erase count (PEC) of the one or more blocks is lower than a PEC count of a set of blocks of the first block stripe.

19. A computerized method comprising:

grouping a plurality of sets of blocks of a set of memory components into respective block stripes;

computing an average width across the block stripes, the average width representing an average quantity of blocks within each of the block stripes that are associated with a reliability grade that transgresses a threshold;

determining that a first block stripe of the block stripes includes a lesser quantity of blocks, associated with reliability grades that transgress the threshold, than the average quantity of blocks; and in response to determining that the first block stripe includes the lesser quantity of blocks than the average quantity of blocks, associating one or more blocks of a second block stripe of the block stripes with the first block stripe.

20. A non-transitory computer-readable storage medium comprising instructions that, when executed by a processing device, cause the processing device to perform operations comprising:

grouping a plurality of sets of blocks of a set of memory components into respective block stripes;

computing an average width across the block stripes, the average width representing an average quantity of blocks within each of the block stripes that are associated with a reliability grade that transgresses a threshold;

determining that a first block stripe of the block stripes includes a lesser quantity of blocks, associated with reliability grades that transgress the threshold, than the average quantity of blocks; and in response to determining that the first block stripe includes the lesser quantity of blocks than the average quantity of blocks, associating one or more blocks of a second block stripe of the block stripes with the first block stripe.

* * * * *